US006460930B2

(12) United States Patent
Thornton

(10) Patent No.: US 6,460,930 B2
(45) Date of Patent: Oct. 8, 2002

(54) CONVERTIBLE CLINICAL CHAIR/TABLE APPARATUS

(76) Inventor: Belinda D. Thornton, 1602 Broadway Blvd., Florence, AL (US) 35630

( * ) Notice: Subject to any disclaimer, the term of this patent is extended or adjusted under 35 U.S.C. 154(b) by 35 days.

(21) Appl. No.: 09/727,414

(22) Filed: Dec. 1, 2000

(65) Prior Publication Data

US 2002/0067057 A1 Jun. 6, 2002

(51) Int. Cl.[7] .................................................. B60N 2/02

(52) U.S. Cl. ............................ 297/354.13; 297/DIG. 4; 297/423.26; 297/173; 297/411.26; 297/344.19

(58) Field of Search ............................. 297/397, 452.2, 297/DIG. 4, 344.19, 354.12, 354.13, 411.26, 411.27, 173, 411.2, 423.26, 316, 170, 118, 440.1; 280/250.1

(56) References Cited

U.S. PATENT DOCUMENTS

| | | | | |
|---|---|---|---|---|
| 2,609,862 | A | * | 9/1952 | Pratt |
| 2,641,306 | A | * | 6/1953 | Lerman |
| 3,216,738 | A | * | 11/1965 | Bockus |
| 3,674,310 | A | * | 7/1972 | Montagano |
| 3,937,519 | A | * | 2/1976 | Schoolden |
| 3,985,389 | A | * | 10/1976 | Bonfield |
| 4,453,768 | A | | 6/1984 | Cranford, Jr. et al. |
| 4,893,827 | A | * | 1/1990 | Gay et al. |
| 5,007,679 | A | | 4/1991 | Mizelle |
| 5,050,899 | A | | 9/1991 | Stensby |
| 5,074,617 | A | * | 12/1991 | Maxwell |
| 5,161,812 | A | * | 11/1992 | DeWeese |
| 5,438,722 | A | | 8/1995 | Jayamanne |
| D379,409 | S | | 5/1997 | Schwaegerle et al. |
| 5,931,535 | A | | 8/1999 | Sweet |

* cited by examiner

*Primary Examiner*—Milton Nelson, Jr.

(57) ABSTRACT

A convertible clinical chair/table apparatus for allowing patients to easily and conveniently get in and out of the clinical chair. The convertible clinical charitable apparatus includes a wheel assembly; and also includes a seat assembly including first and second frame members; and further includes a backrest assembly being pivotally attached to the seat assembly; and also includes a footrest member being pivotally attached to the seat assembly; and further includes an armrest assembly being detachably mounted to the seat assembly; and also includes a seat lift assembly being mounted to the seat assembly.

14 Claims, 4 Drawing Sheets

CONVERTIBLE CLINICAL CHAIR/TABLE APPARATUS

BACKGROUND OF THE INVENTION

1. Field of the Invention

The present invention relates to a clinical chair/table and more particularly pertains to a new convertible clinical chair/table apparatus for allowing patients to easily and conveniently get in and out of the clinical chair.

2. Description of the Prior Art

The use of a clinical chair/table is known in the prior art. More specifically, a clinical chair/table heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,931,535; U.S. Pat. No. 5,438,722; U.S. Pat. No. 4,453,768; U.S. Pat. No. 5,007,679; U.S. Pat. No. 5,050,8991; and U.S. Pat. No. Des. 379,409.

While these devices fulfill their respective, particular objectives and requirements, the aforementioned patents do not disclose a new convertible clinical chair/table apparatus. The inventive device includes a wheel assembly; and also includes a seat assembly including first and second frame members; and further includes a backrest assembly being pivotally attached to the seat assembly; and also includes a footrest member being pivotally attached to the seat assembly; and further includes an armrest assembly being detachably mounted to the seat assembly; and also includes a seat lift assembly being mounted to the seat assembly.

In these respects, the Convertible clinical chair/table apparatus according to the present invention substantially departs from the conventional concepts and designs of the prior art, and in so doing provides an apparatus primarily developed for the purpose of allowing patients to easily and conveniently get in and out of the clinical chair.

SUMMARY OF THE INVENTION

In view of the foregoing disadvantages inherent in the known types of clinical chair/table now present in the prior art, the present invention provides a new convertible clinical chair/table apparatus construction wherein the same can be utilized for allowing patients to easily and conveniently get in and out of the clinical chair.

The general purpose of the present invention, which will be described subsequently in greater detail, is to provide a new convertible clinical chair/table apparatus which has many of the advantages of the clinical chair/table mentioned heretofore and many novel features that result in a new convertible clinical chair/table apparatus which is not anticipated, rendered obvious, suggested, or even implied by any of the prior art clinical chair/table, either alone or in any combination thereof.

To attain this, the present invention generally comprises a wheel assembly; and also includes a seat assembly including first and second frame members; and further includes a backrest assembly being pivotally attached to the seat assembly; and also includes a footrest member being pivotally attached to the seat assembly; and further includes an armrest assembly being detachably mounted to the seat assembly; and also includes a seat lift assembly being mounted to the seat assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new convertible clinical chair/table apparatus which has many of the advantages of the clinical chair/table mentioned heretofore and many novel features that result in a new convertible clinical chair/table apparatus which is not anticipated, rendered obvious, suggested, or even implied by any of the prior art clinical chair/table, either alone or in any combination thereof.

It is another object of the present invention to provide a new convertible clinical chair/table apparatus which may be easily and efficiently manufactured and marketed.

It is a further object of the present invention to provide a new convertible clinical chair/table apparatus which is of a durable and reliable construction.

An even further object of the present invention is to provide a new convertible clinical chair/table apparatus which is susceptible of a low cost of manufacture with regard to both materials and labor, and which accordingly is then susceptible of low prices of sale to the consuming public, thereby making such convertible clinical chair/table apparatus economically available to the buying public.

Still yet another object of the present invention is to provide a new convertible clinical chair/table apparatus which provides in the apparatuses and methods of the prior art some of the advantages thereof, while simultaneously overcoming some of the disadvantages normally associated therewith.

Still another object of the present invention is to provide a new convertible clinical chair/table apparatus for allowing patients to easily and conveniently get in and out of the clinical chair.

Yet another object of the present invention is to provide a new convertible clinical chair/table apparatus which includes a wheel assembly; and also includes a seat assembly including first and second frame members; and further includes a backrest assembly being pivotally attached to the seat assembly; and also includes a footrest member being pivotally attached to the seat assembly; and further includes an armrest assembly being detachably mounted to the seat assembly; and also includes a seat lift assembly being mounted to the seat assembly.

Still yet another object of the present invention is to provide a new convertible clinical chair/table apparatus that allows patients to be easily moved to a wheel chair Even still another object of the present invention is to provide a new convertible clinical chair/table apparatus that allows the patient to either be seated upright or be lying prone as desired from the procedures needed to be done on the patient.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
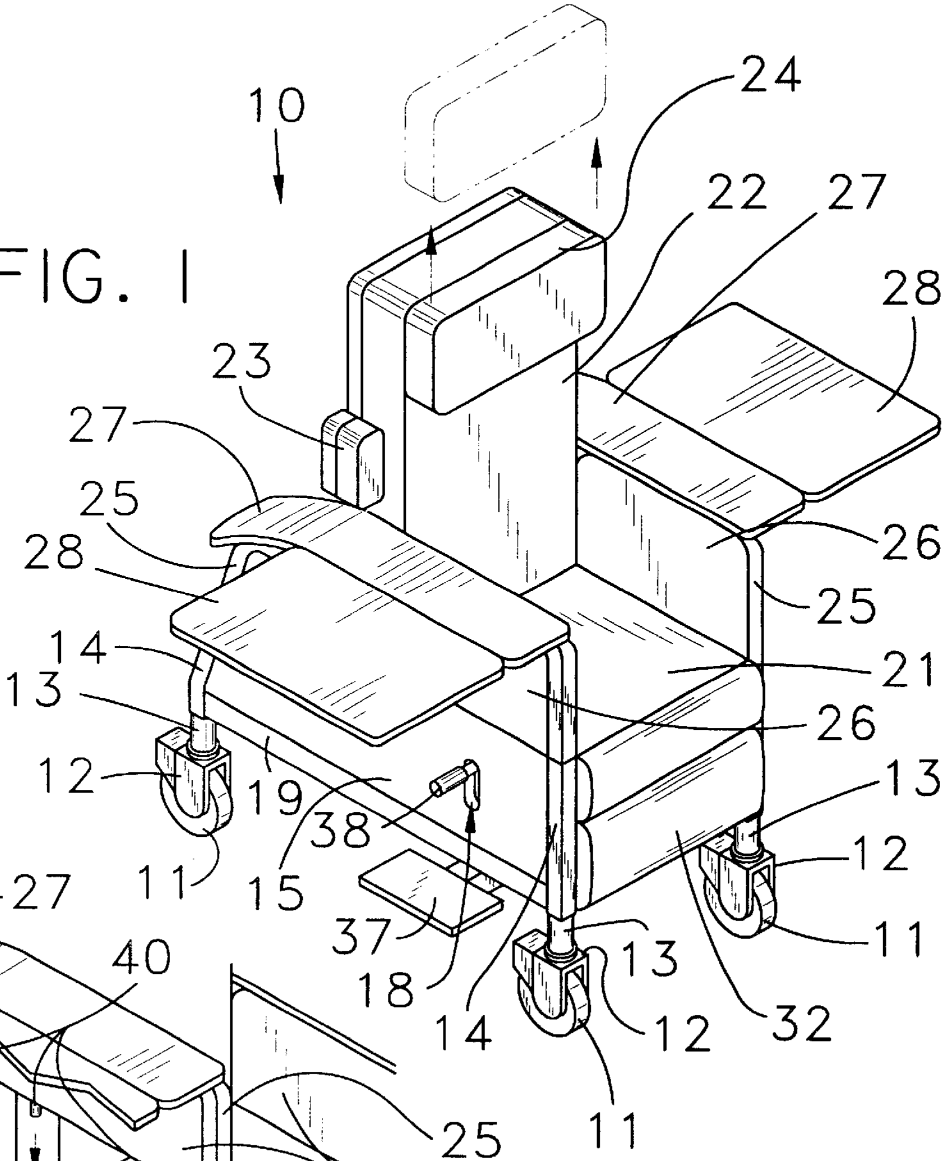
FIG. 1 is a perspective view of a new convertible clinical chair/table apparatus according to the present invention.
Figure 3:
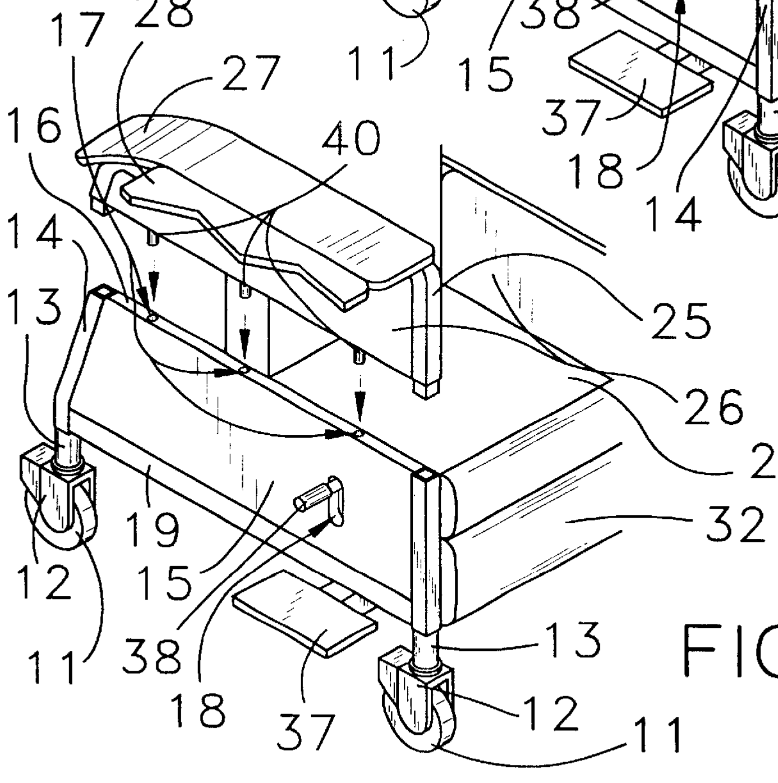
FIG. 3 is a partial exploded perspective view of the present invention.
Figure 2:
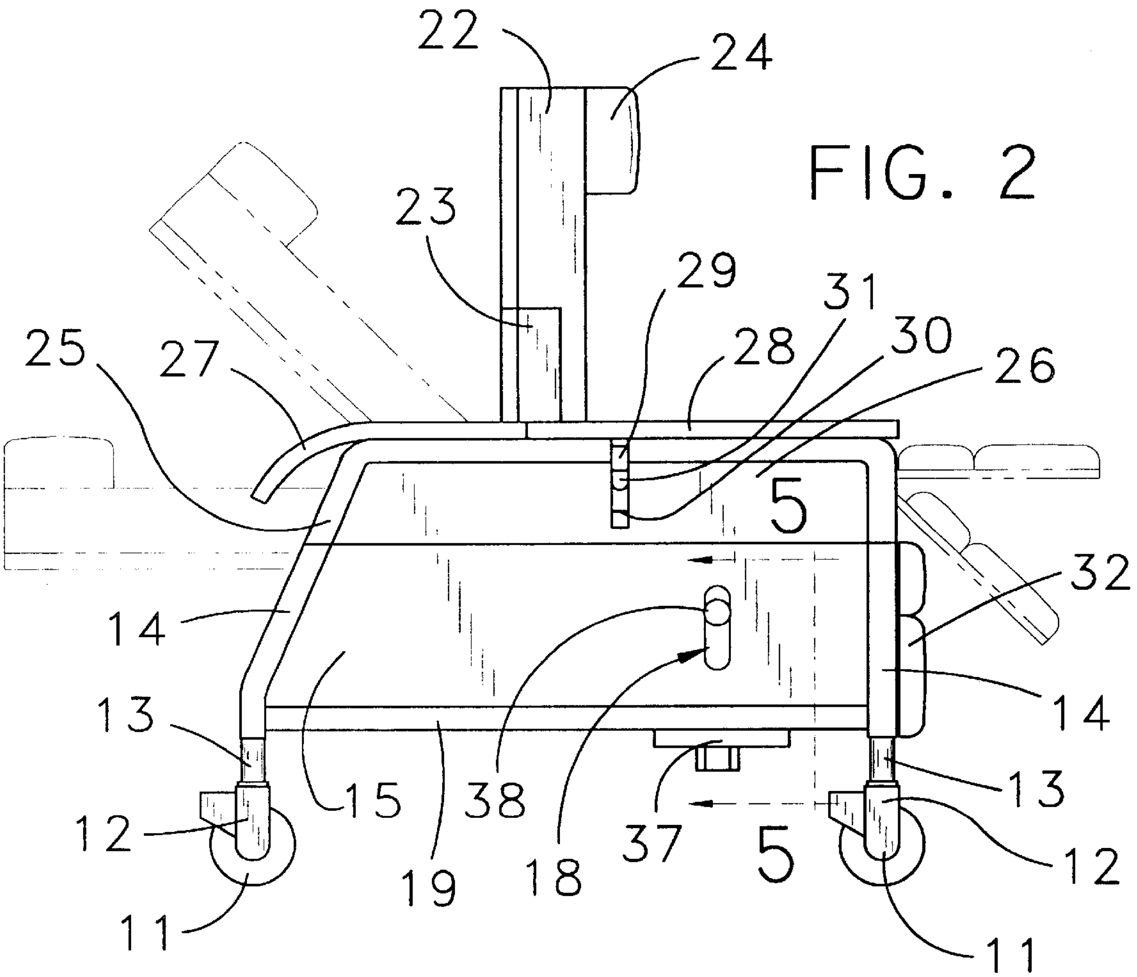
FIG. 2 is a side elevational view of the present invention.
Figure 4:
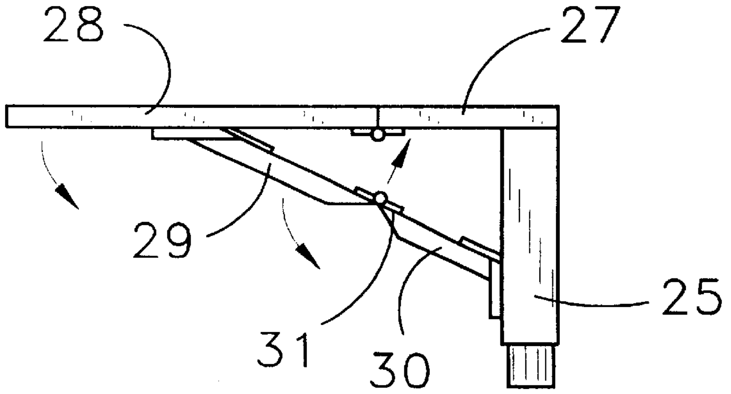
FIG. 4 is a detailed front elevational view of the leaf table and armrest member of the present invention.
Figure 5:
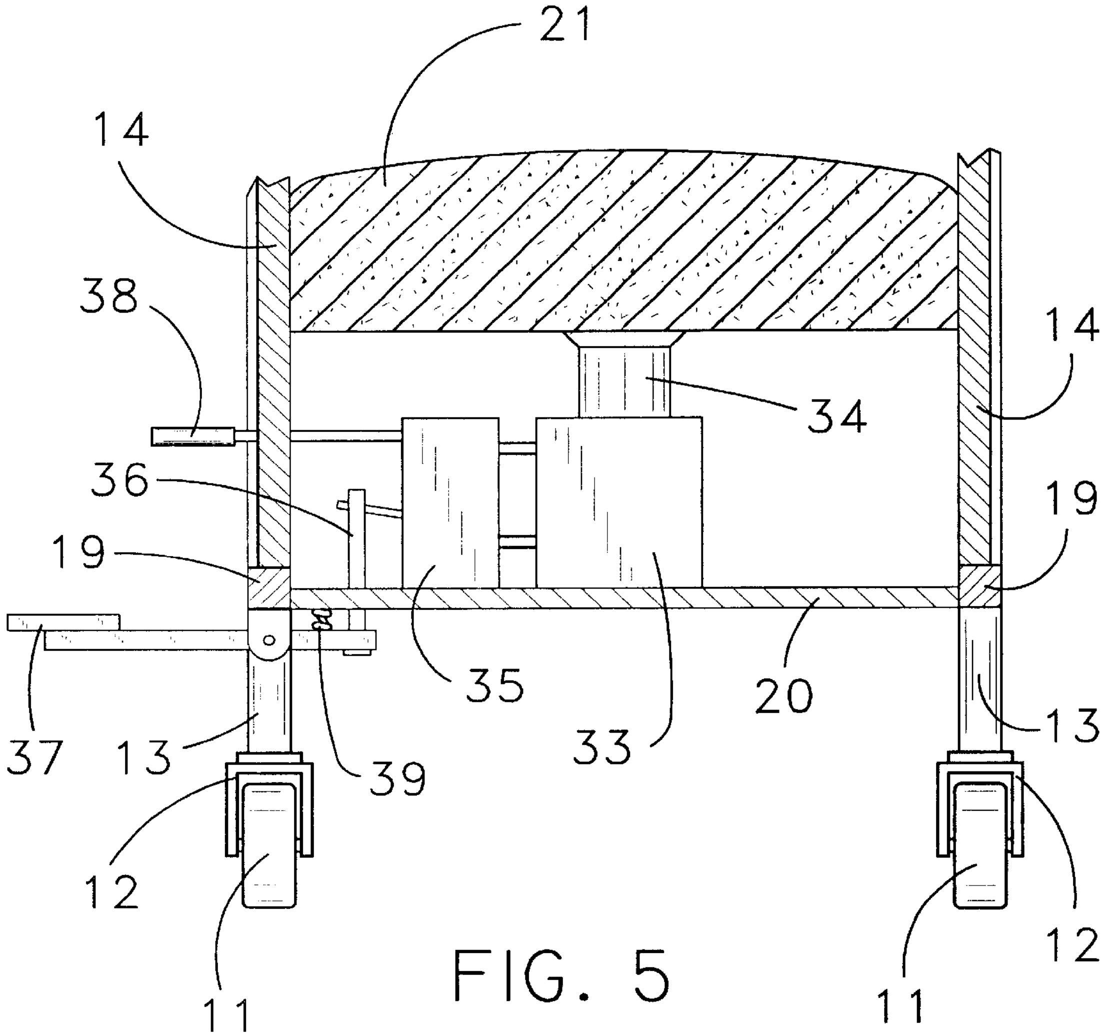
FIG. 5 is a front elevational view of the lift assembly of the present invention.
Figure 6:
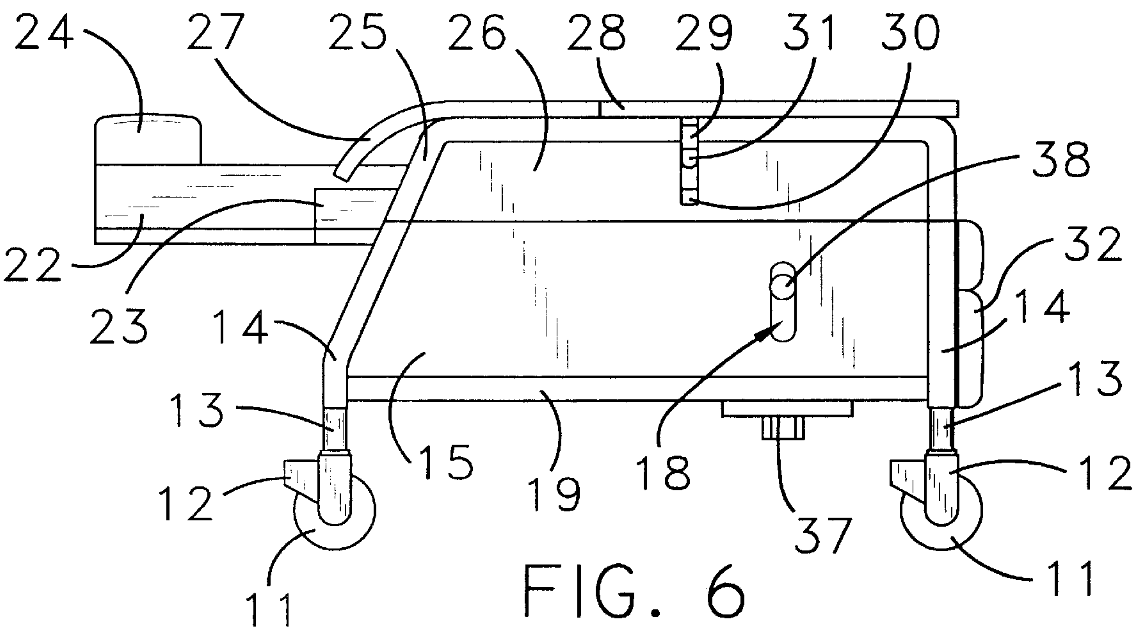
FIG. 6 is another side elevational view of the present invention
Figure 7:
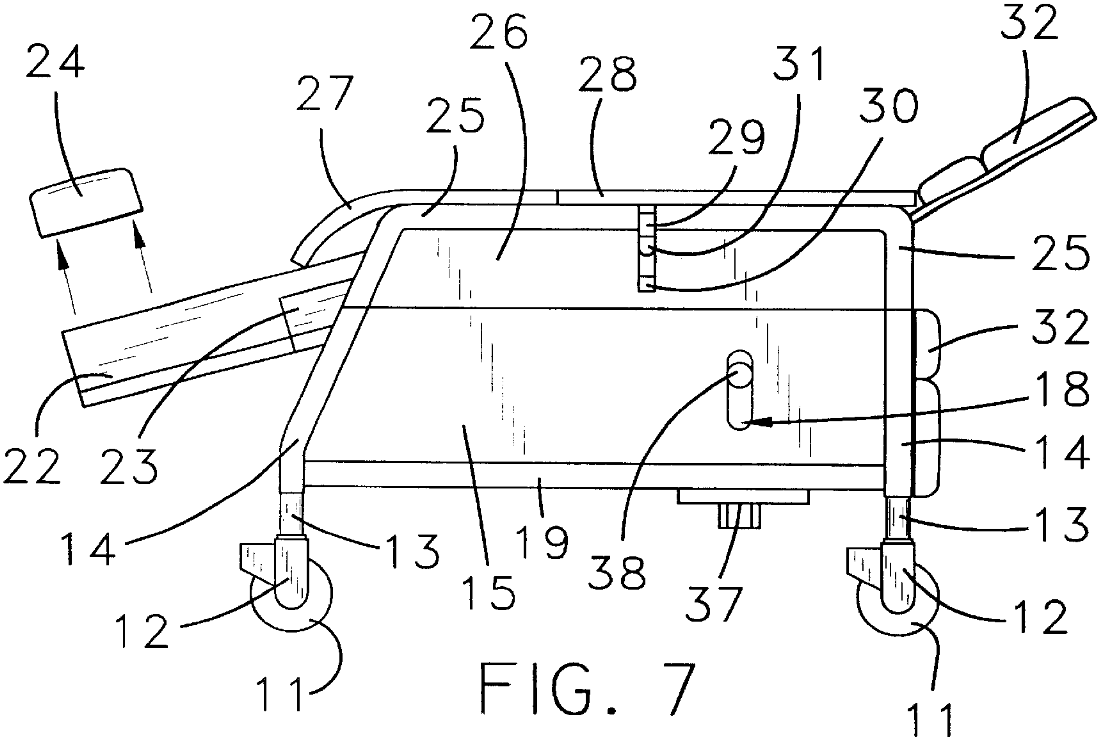
FIG. 7 is yet another side elevational view of the present invention.

With reference now to the drawings, and in particular to FIGS. 1 through 7 thereof, a new convertible clinical chair/table apparatus embodying the principles and concepts of the present invention and generally designated by the reference numeral 10 will be described.

As best illustrated in FIGS. 1 through 7, the convertible clinical chair/table apparatus 10 generally comprises a wheel assembly including bracket members 12, and also including wheel members 11 being conventionally mounted to the bracket members 12, and further including elongate frame support members 13 being securely and conventionally attached to the bracket members 12 and extending upwardly therefrom.

A seat assembly includes first and second frame members. The first and second frame members include elongate tubular members 14, and also include side walls 15 being securely and conventionally attached to the elongate tubular members 14, and further include elongate side members 19 each of which conventionally interconnects a respective pair of the elongate tubular members 14, and also include cross members 20 conventionally interconnecting the elongate side members 19 and extending therebetween. The seat assembly further includes a cushioned seat member 21 being conventionally disposed between the side walls 15 of the first and second frame members. One of the side walls 15 has an elongate opening 18 extending therethrough and each of the side walls 15 having holes 17 being spaced apart and being disposed in a top edge 16 thereof. Each of the elongate tubular members 14 has an open bottom and an open top and is adapted to receive a respective elongate frame support member 13 through the open bottom thereof.

A backrest assembly is pivotally attached to the seat assembly. The backrest assembly includes a cushioned backrest member 22 which is pivotally and conventionally attached to the frame members and which is disposed at a back end of the cushioned seat member 21, and also includes a padded arm member 23 being securely and conventionally attached to a side of the backrest member 22, and further includes a headrest member 24 being removably and conventionally attached to the backrest member 22 near a top thereof. A footrest member 32 is pivotally and conventionally attached to the seat assembly with the footrest member 32 being cushioned and being pivotally attached to the frame members.

An armrest assembly is detachably mounted to the seat assembly. The armrest assembly includes curved tubular support members 25 having ends which are removably received in the open tops of the elongate tubular members 14 of the frame members, and also includes side walls 26 which are securely and conventionally attached to the curved tubular support members 25 and which have peg-like members 40 being spaced apart and being conventionally disposed in a bottom edge of the side walls 26 of the armrest assembly, and further includes armrest members 27 being securely and conventionally attached upon the curved tubular support members 27 and having curved end portions, and also includes leaf table members 28 being hingedly and conventionally attached along longitudinal edges of the armrest members 27, and further includes first table support members 29 being securely and conventionally attached to undersides of the leaf table members 28, and also includes second table support members 30 being securely and conventionally attached to the side walls 26 of the armrest assembly and being hingedly attached to the first table support members 28, and further includes latch members 31 being securely and conventionally attached to the table support members 29,30 for locking the first and second table support members 29,30 in extended positions with the leaf table members 28 being raised in upwardly positions.

A seat lift assembly is securely and conventionally mounted to the seat assembly. The seat lift assembly includes a hydraulic ram 33 being securely and conventionally mounted upon the cross members 20, and also includes a piston 34 being movably and extendably disposed in the hydraulic ram 33 and being conventionally attached to a bottom side of the cushioned seat member 21, and further includes an hydraulic fluid reservoir 35 being securely and conventionally mounted upon the cross members 20 and being connected to the hydraulic ram 33 with a hose, and also includes a linkage 36 being conventionally connected to the reservoir 35, and further includes a foot pedal member 37 being conventionally attached to the linkage 36 for raising the piston 34, and also includes a piston lowering lever 38 being conventionally connected to the hydraulic ram 33 and being extended through the elongate opening 18 in one of the side walls 15 of the first and second frame members, and further includes a spring member 39 being conventionally disposed between the foot pedal member 37 and one of the cross members 20 for biasing the foot pedal member 37 upwardly.

In use, the user can be seated upon the cushioned seat member 21 either in an upright position or in a prone position with the armrest member 32 and the backrest member 22 being raised upwardly to a horizontal position. The seat cushion member 21 can be raised and lowered by using the foot pedal member 37 and the piston lowering lever 38. The armrest assembly can be easily removed from the frame members so that the user can be easily seated upon and removed from the cushioned seat member 21.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A convertible clinical chair/table apparatus comprising:

a wheel assembly;

a seat assembly including first and second frame members;

a backrest assembly being pivotally attached to said seat assembly;

a footrest member being pivotally attached to said seat assembly;

an armrest assembly being detachably mounted to said seat assembly;

a seat lift assembly being mounted to said seat assembly;

wherein said wheel assembly includes bracket members, and also includes wheel members being mounted to said bracket members;

wherein said first and second frame members include elongate tubular members, and also include side walls being securely attached to said elongate tubular members, and further include elongate side members each of which interconnects a respective pair of said elongate tubular members, and also include cross members interconnecting said elongate side members and extending therebetween;

wherein said seat assembly further includes a cushioned seat member being disposed between said side walls of said first and second frame members; and wherein one of said side walls has an elongate opening extending therethrough, and each of said side walls has holes being spaced apart and being disposed in a top edge thereof.

2. A convertible clinical chair/table apparatus as described in claim 1, wherein said wheel assembly includes elongate frame support members being securely attached to said bracket members and extending upwardly therefrom for supporting said first and second frame members.

3. A convertible clinical chair/table apparatus as described in claim 1, wherein each of said elongate tubular members has an open bottom and an open top and is adapted to receive a respective elongate frame support member through said open bottom thereof.

4. A convertible clinical chair/table apparatus as described in claim 3, wherein said armrest assembly includes curved tubular support members having ends which are removably received in said open tops of said elongate tubular members of said frame members, and also includes side walls which are securely attached to said curved tubular support members and which have peg members being spaced apart and being disposed in a bottom edge of said side walls of said armrest assembly, and further includes armrest members being securely attached upon said curved tubular support members, and also includes leaf table members being hingedly attached along longitudinal edges of said armrest members, and further includes first table support members being securely attached to said leaf table members, and also includes second table support members being securely attached to said side walls of said armrest assembly and being hingedly attached to said first table support members, and further includes latch members being securely attached to said table support members for locking said first and second table support members in extended positions with said leaf table members being raised upwardly.

5. A convertible clinical chair/table apparatus as described in claim 1, wherein said seat lift assembly includes a hydraulic ram being securely mounted upon said cross members, and also includes a piston being movably and extendably disposed in said hydraulic ram and being attached to a bottom side of said cushioned seat member, and further includes a reservoir being securely mounted upon said cross members and being connected to said hydraulic ram, and also includes a linkage being connected to said reservoir, and further includes a foot pedal member being attached to said linkage for raising said piston, and also includes a piston lowering lever being connected to said hydraulic ram and being extended through said elongate opening in one of said side walls of said first and second frame members, and further includes a spring member being disposed between said foot pedal member and one of said cross members for biasing said foot pedal member upwardly.

6. A convertible clinical chair/table apparatus as described in claim 1, wherein said footrest member is cushioned and is pivotally attached to said frame members.

7. A convertible clinical chair/table apparatus as described in claim 1, wherein said backrest assembly includes a cushioned backrest member which is pivotally attached to said frame members and which is disposed at a back end of said cushioned seat member, and also includes a padded arm member being securely attached to a side of said backrest member, and further includes a headrest member being removably attached to said backrest member near a top thereof.

8. A convertible clinical chair/table apparatus comprising:

a wheel assembly, said wheel assembly including bracket members, and also including wheel members being mounted to said bracket members, and further including elongate frame support members being securely attached to said bracket members and extending upwardly therefrom;

a seat assembly including first and second frame members, said first and second frame members including elongate tubular members, and also including side walls being securely attached to said elongate tubular members, and further including elongate side members each of which interconnects a respective pair of said elongate tubular members, and also including cross members interconnecting said elongate side members and extending therebetween, said seat assembly further including a cushioned seat member being disposed between said side walls of said first and second frame members, one of said side walls having an elongate opening extending therethrough and each of said side walls having holes being spaced apart and being disposed in a top edge thereof, each of said elongate tubular members having an open bottom and an open top and being adapted to receive a respective said elongate frame support member through said open bottom thereof;

a backrest assembly being pivotally attached to said seat assembly, said backrest assembly including a cushioned backrest member which is pivotally attached to said frame members and which is disposed at a back end of said cushioned seat member, and also including a padded arm member being securely attached to a side of said backrest member, and further including a headrest member being removably attached to said backrest member near a top thereof;

a footrest member being pivotally attached to said seat assembly, said footrest member being cushioned and being pivotally attached to said frame members;

an armrest assembly being detachably mounted to said seat assembly, said armrest assembly including curved tubular support members having ends which are removably received in said open tops of said elongate tubular members, and also including side walls which are securely attached to said curved tubular support members and which have peg members being spaced apart and being disposed in a bottom edge of said side walls of said armrest assembly, and further including armrest members being securely attached upon said curved tubular support members, and also including leaf table members being hingedly attached along longitudinal edges of said armrest members, and further including first table support members being securely attached to said leaf table members, and also including second table support members being securely attached to said side walls of said armrest assembly and being hingedly attached to said first table support members, and further including latch members being securely attached to said table support members for locking said first and second table support members in extended positions with said leaf table members being raised upwardly; and a seat lift assembly being mounted to said seat assembly, said seat lift assembly including a hydraulic ram being securely mounted upon said cross members, and also including a piston being movably and extendably disposed in said hydraulic ram and being attached to a bottom side of said cushioned seat member, and further including a reservoir being securely mounted upon said cross members and being connected to said hydraulic ram, and also including a linkage being connected to said reservoir, and further including a foot pedal member being attached to said linkage for raising said piston, and also including a piston lowering lever being connected to said hydraulic ram and being extended through said elongate opening in one of said side walls of said first and second frame members, and further including a spring member being disposed between said foot pedal member and one of said cross members for biasing said foot pedal member upwardly.

9. A convertible clinical chair/table apparatus comprising:

a wheel assembly;

a seat assembly including first and second frame members;

a backrest assembly being pivotally attached to said seat assembly;

a footrest member being pivotally attached to said seat assembly;

an armrest assembly being detachably mounted to said seat assembly;

a seat lift assembly being mounted to said seat assembly, wherein said wheel assembly includes bracket members, and also includes wheel members being mounted to said bracket members, and further includes elongate frame support members being securely attached to said bracket members and extending upwardly therefrom;

wherein said first and second frame members include elongate tubular members, and also include side walls being securely attached to said elongate tubular members, and further include elongate side members each of which interconnects a respective pair of said elongate tubular members, and also include cross members interconnecting said elongate side members and extending there between;

wherein said seat assembly further includes a cushioned seat member being disposed between said side walls of said first and second frame members; and wherein one of said side walls has an elongate opening extending therethrough, and each of said side walls has holes being spaced apart and being disposed in a top edge thereof.

10. A convertible clinical chair/table apparatus as described in claim 9, wherein said footrest member is cushioned and is pivotally attached to said frame members.

11. A convertible clinical chair/table apparatus as described in claim 9, wherein said seat lift assembly includes a hydraulic ram being securely mounted upon said cross members, and also includes a piston being movably and extendably disposed in said hydraulic ram and being attached to a bottom side of said cushioned seat member, and further includes a reservoir being securely mounted upon said cross members and being connected to said hydraulic ram, and also includes a linkage being connected to said reservoir, and further includes a foot pedal member being attached to said linkage for raising said piston, and also includes a piston lowering lever being connected to said hydraulic ram and being extended through said elongate opening in one of said side walls of said first and second frame members, and further includes a spring member being disposed between said foot pedal member and one of said cross members for biasing said foot pedal member upwardly.

12. A convertible clinical chair/table apparatus as described in claim 9, wherein each of said elongate tubular members has an open bottom and an open top and is adapted to receive a respective said elongate frame support member through said open bottom thereof.

13. A convertible clinical chair/table apparatus as described in claim 12, wherein said armrest assembly includes curved tubular support members having ends which are removably received in said open tops of said elongate tubular members of said frame members, and also includes side walls which are securely attached to said curved tubular support members and which have peg members being spaced apart and being disposed in a bottom edge of said side walls of said armrest assembly, and further includes armrest members being securely attached upon said curved tubular support members, and also includes leaf table members being hingedly attached along longitudinal edges of said armrest members, and further includes first table support members being securely attached to said leaf table members, and also includes second table support members being securely attached to said side walls of said armrest assembly and being hingedly attached to said first table support members, and further includes latch members being securely attached to said table support members for locking said first and second table support members in extended positions with said leaf table members being raised upwardly.

14. A convertible clinical chair/table apparatus as described in claim 9, wherein said backrest assembly includes a cushioned backrest member which is pivotally attached to said frame members and which is disposed at a back end of said cushioned seat member, and also includes a padded arm member being securely attached to a side of said backrest member, and further includes a headrest member being removably attached to said backrest member near a top thereof.

* * * * *